(12) United States Patent
Patil et al.

(10) Patent No.: US 11,336,568 B2
(45) Date of Patent: May 17, 2022

(54) SYSTEM AND METHOD FOR AUTHORIZING TRAFFIC FLOWS

(71) Applicant: Sandvine Corporation, Waterloo (CA)

(72) Inventors: Rajeshwar Patil, Bengaluru (IN); Gangaraju K Siddalingaiah, Bengaluru (IN); Kemparaju Sannamariyappa, Bengaluru (IN)

(*) Notice: Subject to any disclaimer, the term of this patent is extended or adjusted under 35 U.S.C. 154(b) by 0 days.

(21) Appl. No.: 17/120,354

(22) Filed: Dec. 14, 2020

(65) Prior Publication Data
US 2021/0184967 A1 Jun. 17, 2021

(30) Foreign Application Priority Data
Dec. 16, 2019 (IN) ............................. 201911052163

(51) Int. Cl.
| | |
|---|---|
| *H04L 12/721* | (2013.01) |
| *H04L 29/12* | (2006.01) |
| *H04L 1/18* | (2006.01) |
| *H04L 45/00* | (2022.01) |
| *H04L 47/2483* | (2022.01) |
| *H04L 47/41* | (2022.01) |
| *H04L 101/663* | (2022.01) |

(52) U.S. Cl.
CPC ............ *H04L 45/38* (2013.01); *H04L 1/1858* (2013.01); *H04L 45/14* (2013.01); *H04L 45/22* (2013.01); *H04L 45/72* (2013.01); *H04L 47/2483* (2013.01); *H04L 47/41* (2013.01); *H04L 61/6063* (2013.01)

(58) Field of Classification Search
CPC ......... H04L 45/38; H04L 45/14; H04L 45/72; H04L 47/2483; H04L 47/41; H04L 61/203; H04L 61/6063; H04L 41/5019; H04L 65/1046; H04L 67/02; H04L 69/161; H04L 45/745; H04L 63/10; H04L 65/1069; H04L 65/80; H04L 47/193; H04L 29/12245
See application file for complete search history.

(56) References Cited

U.S. PATENT DOCUMENTS

| | | | |
|---|---|---|---|
| 9,571,498 B1* | 2/2017 | Glick | ...................... H04L 63/10 |
| 11,153,203 B2* | 10/2021 | Osman | ................ H04L 47/2483 |
| 2016/0142307 A1* | 5/2016 | Kamper | .............. H04L 12/4633 |
| | | | 709/238 |

* cited by examiner

*Primary Examiner* — Mohamed A Kamara
(74) *Attorney, Agent, or Firm* — Amarok IP Inc.; Neil W. Henderson

(57) ABSTRACT

A method and system for authorizing traffic flows in a computer network. The method including: receiving a packet from a traffic flow sent by a sender; determining whether the traffic flow has been previously authorized; if the traffic flow has not been previously authorized: determining a subscriber associated with the traffic flow, based on the data retrieved from the packet; requesting authorization from an authorization server based on the subscriber and the data retrieved from the packet; upon receiving a response from the authorization server, sending at least three duplicate acknowledgments to the sender, to generate a retransmission in advance of the standard retransmission timing; otherwise, if the traffic flow has been previously authorized, allowing the packet to continue to a destination.

20 Claims, 11 Drawing Sheets

SYSTEM AND METHOD FOR AUTHORIZING TRAFFIC FLOWS

RELATED APPLICATION

The present disclosure claims priority to Indian Patent Application No. 201911052163 filed on Dec. 16, 2019, which is hereby incorporated in its entirety herein.

FIELD

The present disclosure relates generally to computer network traffic. More particularly, the present disclosure relates to a system and method for authorization of Transmission Control Protocol (TCP) and Steam Control Transmission Protocol (STCP) data flows.

BACKGROUND

Internet users access networks via Internet Service Providers (ISP). When accessing the Internet, ISP's authenticate subscribers and validate the subscribers' authorization for the type of traffic initiated. This task is conventionally performed by Data Plane equipment when a new data flow for an application is recognized or seen.

In conventional systems, Data Plane equipment communicates with authentication, authorization, and accounting (AAA) servers, for example, a Lightweight Directory Access Protocol (LDAP) server, Policy and Charging Rules Function (PCRF), Online Charging System (OCS) or the like, for this operation. Until a user has been authorized, a user is typically prevented from carrying on other actions. Waiting for authentication and authorization, and having restricted online access may greatly affect a user's Quality of Experience (QoE).

As connectivity speed and reliability of online access increases, any type of delay for a user tends to be viewed negatively. As such, there is a need for an improved method and system for authorization of TCP and STCP data flows.

The above information is presented as background information only to assist with an understanding of the present disclosure. No determination has been made, and no assertion is made, as to whether any of the above might be applicable as prior art with regard to the present disclosure.

SUMMARY

In a first aspect, there is provided a method for authorizing traffic flows in a computer network, the method including: receiving a packet from a traffic flow sent by a sender; determining whether the traffic flow has been previously authorized; if the traffic flow has not been previously authorized: determining a subscriber associated with the traffic flow, based on the data retrieved from the packet; requesting authorization from an authorization server based on the subscriber and the data retrieved from the packet; upon receiving a response from the authorization server, sending at least three duplicate acknowledgments to the sender, to generate a retransmission in advance of the standard retransmission timing; otherwise, if the traffic flow has been previously authorized, allowing the packet to continue to a destination.

In some cases, determining whether the traffic flow has been previously authorized may include determining whether the traffic flow has been previously refused; and if the traffic flow has been refused, redirecting the subscriber's traffic flow to provide the subscriber with further information regarding the refusal.

In some cases, determining the subscriber associated with the traffic flow may include determining subscriber name and subscriber IP address.

In some cases, the data retrieved from the packet may include retrieving the application type of the traffic flow.

In some cases, authorization may be based on the application type of the traffic flow and the subscriber associated with the traffic flow.

In some cases, the method may include, on receiving a response from the authorization server, determining whether the subscriber is associated with any other traffic flows with the same application type; and sending at least three duplicate acknowledgments to the sender for each traffic flow of the same application type, to generate a retransmission in advance of the standard retransmission timing In some cases, the data retrieved from the packet may include retrieving the destination URL of the traffic flow and authorization may be based on the URL of the traffic flow.

In some cases, the traffic flow may be a TCP traffic flow or an SCTP traffic flow.

In some cases, the authorization server may be selected from the group including a Lightweight Directory Access Protocol server, Policy and Changing Rules Function, and Online Charging Systems.

In some cases, the packet may be dropped after a subscriber is associated with the traffic flow and the data is retrieved from the packet.

In another aspect, there is provided a system for authorizing traffic flows in a computer network, the system including: an authorization module configured to receive a packet from a traffic flow sent by a sender and determine a subscriber associated with the traffic flow, based on the data retrieved from the packet; an analysis module configured to determine whether the traffic flow has been previously authorized and if the traffic flow has not been previously authorized, request authorization from an authorization server based on the subscriber and the data retrieved from the packet and if the traffic flow has been previously authorized, allow the packet to travel to its destination; and a transmission module configured to send, upon receiving a response from the authorization server, at least three duplicate acknowledgments to the sender, to generate a retransmission in advance of the standard retransmission timing.

In some cases, the analysis module may be configured to determine whether the traffic flow has been previously refused; and if the traffic flow has been refused, the transmission module may be configured to redirect the subscriber's traffic flow to provide the subscriber with further information regarding the refusal.

In some cases, the authorization module may be configured to determine subscriber name and subscriber IP address to associate the subscriber with the traffic flow In some cases, the data retrieved from the packet may include retrieving the application type of the traffic flow.

In some cases, authorization may be based on the application type of the traffic flow and the subscriber associated with the traffic flow.

In some cases, on receiving a response from the authorization server, the analysis module may be configured to determine whether the subscriber is associated with any other traffic flows with the same application type; and the transmission module may be configured to send at least three duplicate acknowledgments to the sender for each traffic flow of the same application type, to generate a retransmission in advance of the standard retransmission timing In some cases, the authorization module may be configured to retrieve the destination URL of the traffic flow from the data retrieved from the packet and the authorization may be based on the URL of the traffic flow.

In some cases, the traffic flow may be a TCP or SCTP traffic flow.

In some cases, the authorization server may be selected from the group comprising a Lightweight Directory Access Protocol server, Policy and Changing Rules Function, and Online Charging Systems.

In some cases, the authorization module may be configured to drop the packet after a subscriber is associated with the traffic flow and the data is retrieved from the packet.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

DETAILED DESCRIPTION

In the following, various example systems and methods will be described herein to provide example embodiment(s). It will be understood that no embodiment described below is intended to limit any claimed invention. The claims are not limited to systems, apparatuses or methods having all of the features of any one embodiment or to features common to multiple or all of the embodiments described herein. A claim may include features taken from any embodiment as would be understood by one of skill in the art. The applicants, inventors or owners reserve all rights that they may have in any invention disclosed herein, for example the right to claim such an invention in a continuing or divisional application and do not intend to abandon, disclaim or dedicate to the public any such invention by its disclosure in this document.

Generally, the present disclosure provides a method and system for authorization of TCP or SCTP traffic flows. The system and method are configured to determine a request from a subscriber to access a computer network, for example a request to a webserver. The system is configured to provide subscriber identification data to an authorization server in order to authorize the subscriber. While the authorization is pending, the traffic from the subscriber is intended to be blocked. On an authorization response, the system may provide for a plurality of duplicate acknowledgements (DUP ACKS) in order to activate a new retransmission from the subscriber. In some cases, DUP ACKS may further incorporate duplicate selective Acknowledgments (DUP SACKS), depending on the traffic flow.

Figure 1:
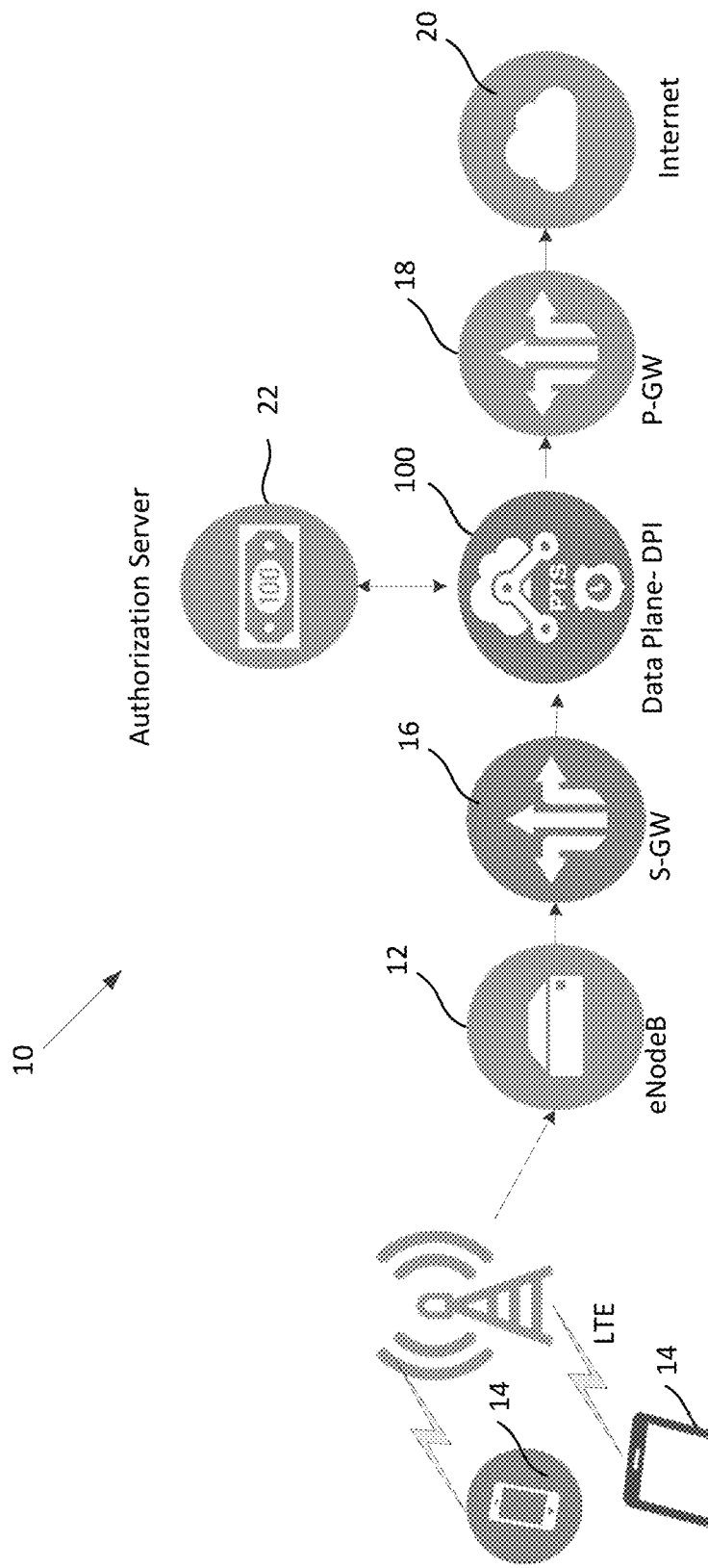
FIG. 1 illustrates a system for authorization of traffic flows according to an embodiment in a network environment.

FIG. 1 shows a diagram of a computer network architecture 10. It will be understood that at least one Evolved Node Base station (eNodeB) 12 resides within a Radio Access Network (RAN) (not shown). The eNodeB 12 is designed to allocate the network resources among the various users and the user devices 14. The RAN is in communication with a core network. The eNodeB 12 connects to the core network via a serving gateway (SGW) 16, which is further in communication with a packet data network gateway (PGW) 18 which is in communication with the Internet 20. The network 10 further includes an Authorization Authentication and Accounting (AAA) server 22, which is configured to authorize user's traffic flows. The system 100 is configured to be transparent to the users. It will be understood that FIG. 1 illustrates a high level network architecture and that a computer network may include further aspects not illustrated. In some cases, the system may be located on the Internet side of the PGW 18.

A system 100 for authorizing traffic flows is intended to reside in the core network. In particular, the system 100 may be an inline probe north of the PGW 18, between the SGW 16 and PGW 18 (as shown), or in another location where the system is able to access the data noted herein for TCP and SCTP traffic flows. It will be understood that in some cases the system may be a physical network device, or may be a virtual networking device. It will be understood that the system may be used on any IP based networking system, for example, WiFi based, mobile data networks like GPRS, CDMA, 4G, 5G, LTE, satellite based, WLAN based networks, fixed line broadband fiber optic networks as well as on virtual private networks.

In conventional solutions, a user or subscriber requesting communication with a webserver may be authenticated and authorized by the service provider. The data plane within the service provider's network may be used to block the user traffic until this authentication is complete. During this period, the user node attempts delivery by resending the data without insight into the authorization process or knowing that the packets being sent are being dropped. Conventionally, once the data plane receives the required clearance from AAA server, the data plane will allow the user's traffic without dropping any further packets.

In conventional solutions, the user node is unaware that the data plane is in the process of blocking the user's traffic; the user node typically treats the packet drop as TCP packet drop and deploys the TCP re-transmission binary exponential back off algorithm where the user node doubles the time between successive retransmissions. The net result of this mechanism is that if the authorization for a request comes during the backoff period, the user starts the data flow when next retransmission is attempted. It has been determined that this delay may influence the quality of experience (QoE) of the user, and increase the delay the user experiences in accessing the desired content. In a heavily loaded system, if AAA server response is delayed, then this wait period for user can becoming increasingly large. A similar result would be experienced in conventional solutions with SCTP traffic flows.

Thus, at the start of the user's traffic flow, the user experiences a delay while authorization is carried out. In order to provide a better Quality of Experience, services providers are interested in minimizing delays such that users experience shorter wait periods.

The system and method detailed herein are intended to address this issue and reduces the wait period for users. The system and method are intended to reduce the wait period to a similar period to the authorization time regardless of binary exponential backoff.

Figure 2:
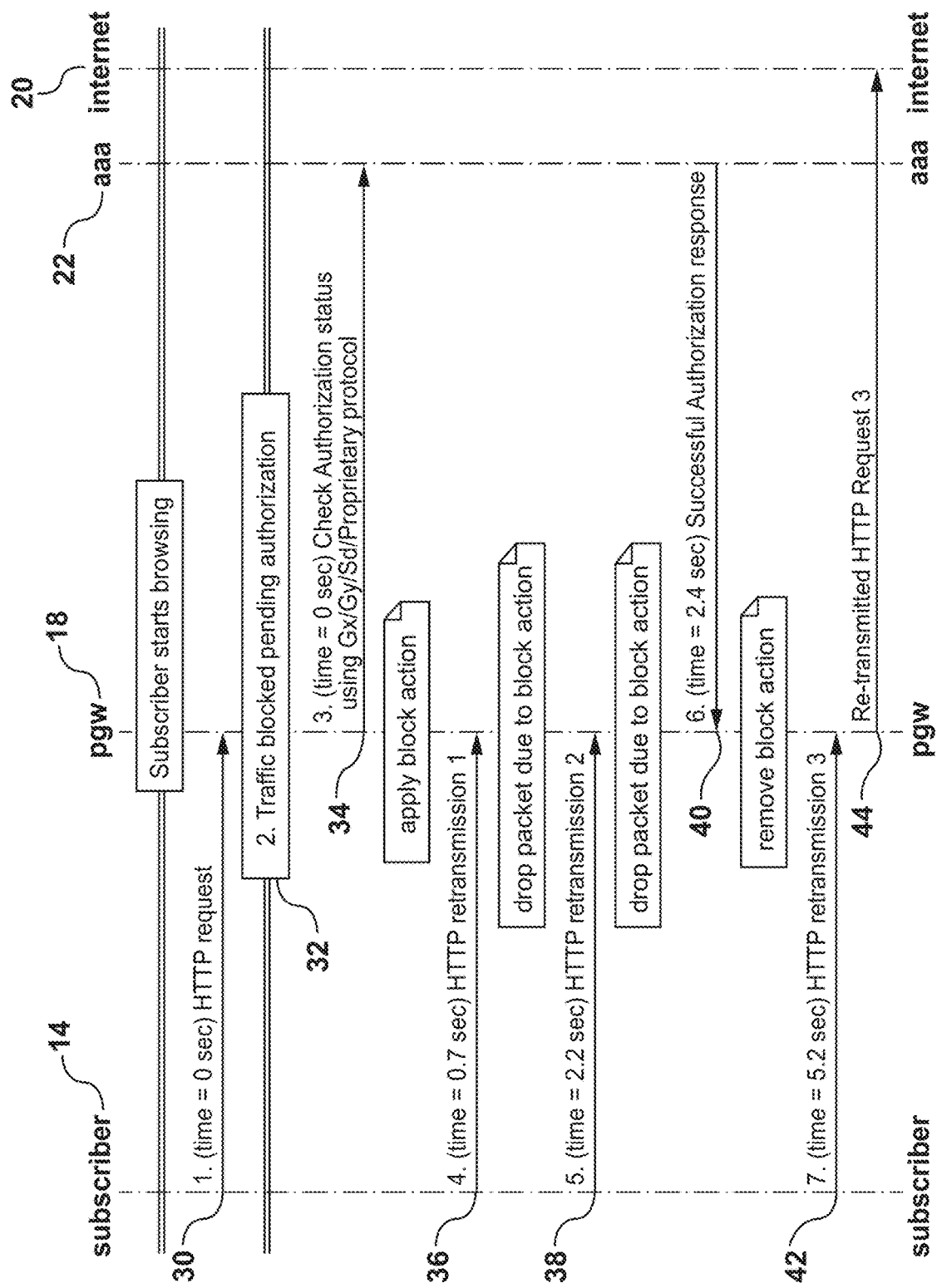
FIG. 2 illustrates a sequence diagram of an initialization of a new TCP data flow; with authorization.

A conventional use case is illustrated in a sequence diagram shown in FIG. 2. In a use case of authorizing a subscriber/subscriber's data applications (for example, YouTube, FaceBook, Netflix etc.) is an integral part of the network management. Until the authorization is complete, the subscriber tends to be blocked from using internet.

Conventionally, data plane devices, for example, PCEF (Policy And Charging Enforcement Function), PGW (Packet Data Network Gateway), TDF (Traffic Detection Function) and the like provide for authorization using various protocols, for example, Diameter Gx, Diameter Gy, Diameter Sd, LDAP (Lightweight Directory Access Protocol) or other protocol. These data plane devices conventionally block the subscriber traffic until authorization response is received from an authorization server, for example a PCRF (Policy And Charging Rule Function), OCS (Online Charging System), LDAP Server or the like.

The blocking of the data traffic by Data Plane devices often results in dropping the TCP packets sent by the subscriber's device. Since the data packets are dropped at the Data Plane, the sender (either the Subscriber or the Web Server) of the data packets will retransmit the dropped data packets using conventional TCP retransmission. The conventional TCP retransmission mechanism of the Subscriber and/or Web Server tends to follow the "binary exponential backoff" algorithm where the subscriber or web server sending the traffic will approximately double the time between successive retransmissions. It will be understood that the time between successive retransmissions may follow other retransmission processes, which are often intended to avoid congestion on the network when a transmission is not successful.

In conventional solutions, the data plane waits until subscriber or Web Server retransmits the dropped packet and once the packet is received on data plane device, the packet is allowed (no longer blocked). As a result of the wait, the QoE of a subscriber may be fairly low during authorization and until the traffic is allowed, which may not be immediately after authorization was complete.

FIG. 2 illustrates the sequence diagram of the retransmission for a specific example. At 30, the subscriber 14 starts browsing at time 0 Sec. At 32, the traffic is blocked due to pending authorization with Authentication, Authorization and Accounting (AAA) server 22. At 34, the data plane device, for example the PGW 18, sends or forwards the request to the AAA server for the subscriber and subscriber's data application. It will be understood that although the AAA server is shown for this example, authorization may be received by another authorization enabled server all generally referred to herein as "authorization servers".

At 36, a first TCP retransmission of the data packet from the subscriber happens at time 0.7 sec. Since authorization has not yet been completed, the data plane device drops the packet. At 38, a second TCP retransmission of the data packet from the subscriber happens at time 2.2 sec, following the binary exponential backoff algorithm (0.7+(0.7*2)= 2.1—therefore the 2.2 sec time has elapsed since the subscriber commenced browsing). As authorization is still not completed, the data plane device drops the packet again.

At 40, at time 2.4 sec, the success response is received on Data Plane device. As authorization has been successful, the data plane device lifts the block action on the subscriber and will now allow packets to pass to the Internet 20. At 42, at time 5.2 sec, the third TCP retransmission happens, and since the block action is lifted for this subscriber, this packet is allowed, at 44.

From the above example, it can be seen that although authorization is complete at time 2.4 seconds, the subscriber is not able to start browsing or accessing the internet until 5.2 seconds. This scenario would reduce the QoE of the subscriber during authorization, and the subsequent waiting time.

Figure 3:
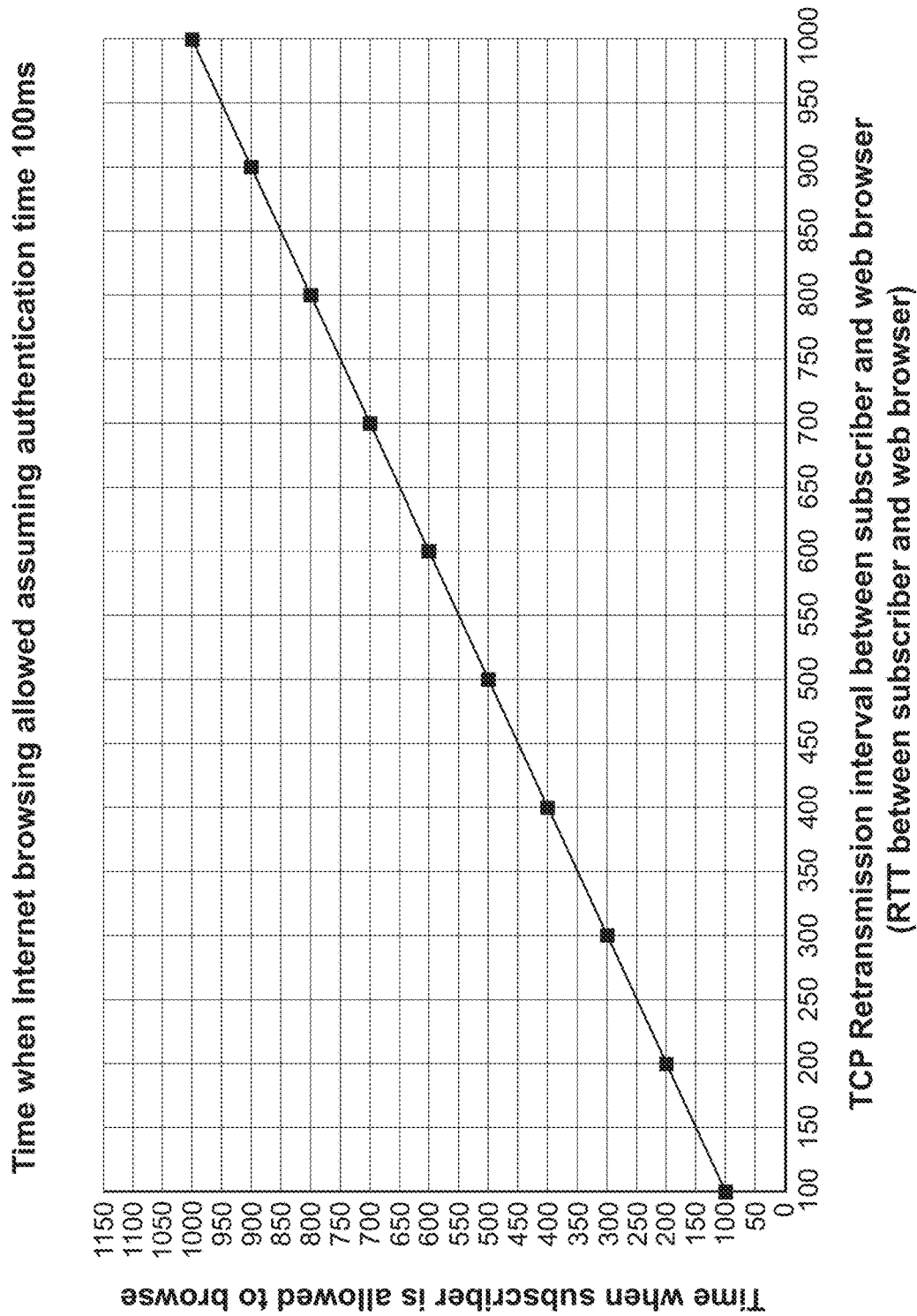
FIG. 3 is a graph illustrating time subscriber can browse in view of round trip time of traffic flow.

FIG. 3 is a graph that illustrates how the internet browsing experience would be during authorization assuming Authorization server takes 100 ms to authorize the service/subscriber. It can be seen in the graph of FIG. 3 that with increased retransmission interval, the time when subscriber is allowed to browse internet also goes up significantly with increased Round Trip Time (RTT) between the subscriber and web browser. With this increased retransmission interval, the subscriber is likely to experience poor QoE. The subscriber is not able to browse until the subsequent retransmission time. In TCP, retransmission interval is derived based on the RTT during a three-way handshake at the initiation of the session. The higher the RTT, the higher the retransmission interval will be. This issue becomes more visible when RTT is high.

Although the authorization for the subscriber is being completed in the background, the subscriber has little insight until the data packets being sent are received successfully. If the subscriber's data packets are blocked for too long then the subscriber's QoE is negatively impacted. The QoE of the subscriber may also be affected by, for example, higher link latency between the data plane device and authorization server; queueing delays at authorization server; processing delays at authorization server; and the like.

Conventional solutions only allow the subscriber to browse the internet based on the above algorithm that has become common in the art. When the retransmission interval is very high, subscriber has to wait even longer after authorization to successfully browse the internet. In FIG. 3, the time taken by the authorization server remains constant. As such, the subscriber's QoE is impacted because of higher retransmission time. Generally, RTT is higher when the distance between the subscriber and the web server is long or the web server is hosted on slow network.

Generally, the authorization server may be slow due to, for example, the distance between data plane device and authorization server is long; the authorization server is hosted on slow network; the authorization server is under high load and is overloaded; or the like.

Figure 4:
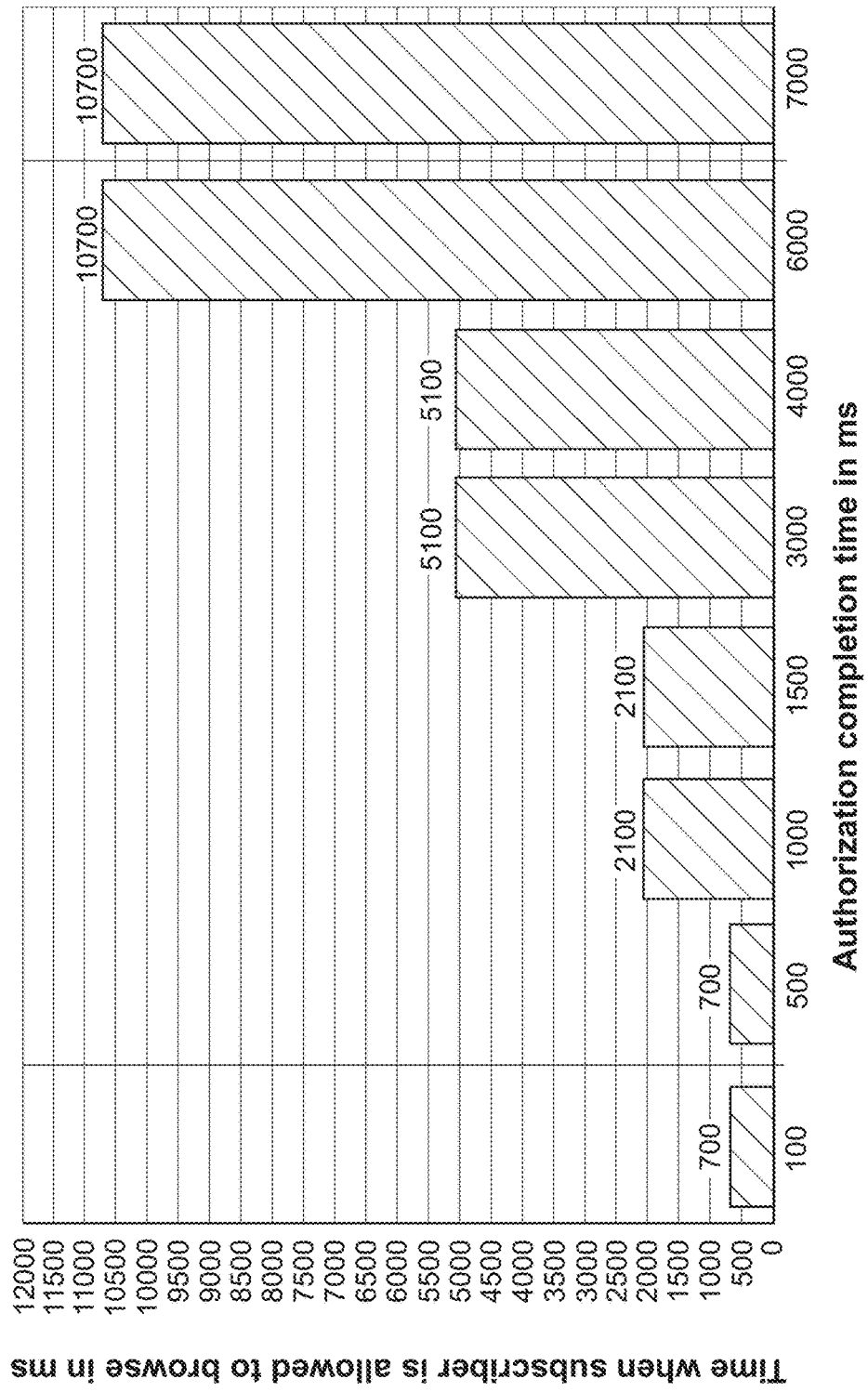
FIG. 4 illustrates time subscriber can browse in view of authorization time for the traffic flow.

FIG. 4 illustrates the time when a subscriber can browse the Internet assuming the retransmission time starts at 0.7 seconds. From FIG. 4, it can be seen that even if authorization is complete, the browsing is not allowed until much later because the data plane device waits for TCP retransmission of the dropped packet. From FIG. 4, it can be seen that increased authorization time makes the subscriber access to internet significantly slower using conventional methods, which would lower the subscriber's QoE substantially.

Conventional solutions tend to rely on the retransmissions of the dropped TCP packets from Subscriber/Web Server. When the Authorization Server is slow, the subscriber has to wait for a longer time even if the authorization has completed earlier.

Figure 5:
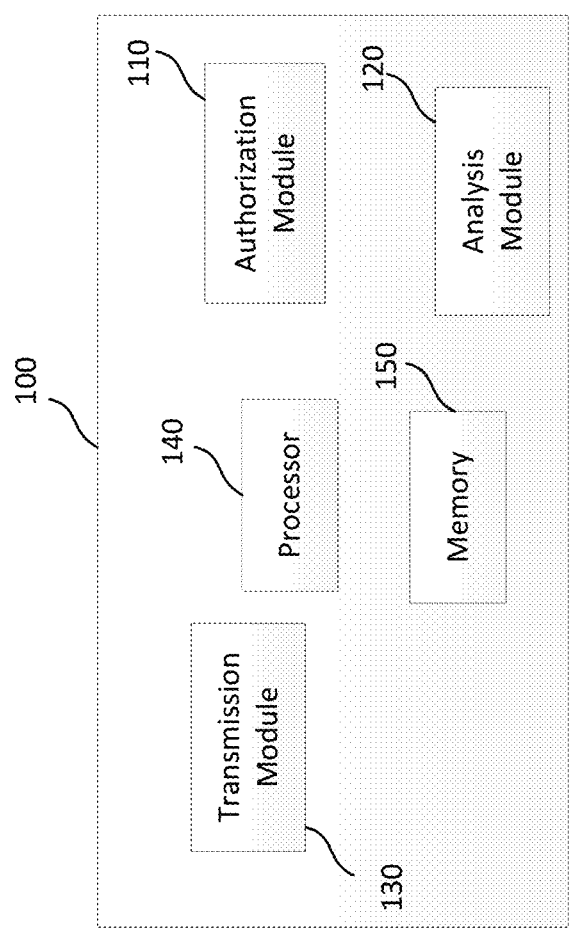
FIG. 5 is a illustrating an embodiment of a system for authorization of traffic flows.

FIG. 5 illustrates an embodiment of a system 100 for authorization of traffic flows, and in particular TCP and SCTP traffic flows. The system includes an authorization module 110, an analysis module 120, a transmission module 130, at least one processor 140 and at least one memory component 150. The system 100 is intended to reside on the core network or the data plane. The modules, including the processor 140 and memory 150, are in communication with each other but may be distributed over various network devices or may be housed within a single network device. The system 100 is intended to receive information from the computer network equipment that allows the system 100 to determine subscriber information.

The authorization module 110 is configured to receive a packet and determine whether the packet from the traffic flow is requesting authorization for a subscriber to browse the Internet or other authorization from a sender as required. The authorization module 110 may associate the packet with a subscriber based on subscriber data, by for example, determining the source of the packet from a header of the packet. In some cases, the subscriber data may include, for example, subscriber name, subscriber IP address, source port, device type, tunnel type and the like. Other ways of associating the packet with a subscriber may be used, for example, deep packet inspection (DPI). The data retrieved by the authorization module 110 may be directed to the authorization server. In some cases, the authorization module 110 may determine or retrieve application type data from the packet in addition to subscriber data. Application type data may include, for example, the application of the data flow (Facebook, YouTube, or the like), the destination or source URL, the destination of the packet, and the like. In some cases, the authorization module is configured to drop the packet after a subscriber has been associated with the traffic flow and the data associated with the traffic flow has been retrieved from the packet.

The analysis module 120 is configured to determine when the subscriber has been authorized or refused. By reviewing the subscriber data, the analysis module 120 may receive the authorization data from the authorization server for the associated subscriber of the traffic flow. If the subscriber has yet to be authorized, the analysis module may request authorization from the authorization server based on the subscriber and the data retrieved from the packet. If the traffic flow has previously been authorized the analysis module may determine that the packet may travel to its destination.

The transmission module 130, on receiving the authorization approval or refusal from the analysis module 120 may transmit a retransmission request, via for example a TCP fast retransmission request, notice to the subscriber user equipment. In some cases, the retransmission request is intended to be at least three duplicate acknowledgements. As the retransmission request will not require the subscriber to wait until a standard retransmission time for retransmitting the request, the subscriber will be able to begin browsing almost immediately after authorization.

In some case, the analysis module 120 may determine that the subscriber is not authorized, or that authorization has been refused by the authorization server. The analysis module 120 may direct the transmission module 130 to transmit the duplicate acknowledgements whether the user is authorized or refused. On receiving the retransmitted packet, the authorization module 110 is intended to determine that the subscriber has been refused. On determining the subscriber has been refused, the analysis module 120 may transmit a message or notice to the subscriber informing the subscriber about the refusal. In some cases, the subscriber may be directed, to a different sign in page, or to the service operator's page in order for the subscriber to add money to the subscriber's Internet plan, or otherwise perform an action that would allow the subscriber to be authorized or provide further information regarding the refusal.

The transmission module 130 is intended to provide TCP Fast retransmission for a TCP traffic flow or a similar response to an SCTP traffic flow. Typically TCP fast retransmission is used by TCP endpoint nodes to allow for fast recovery during the network congestion. The fast retransmit and recovery (FRR) is a congestion control method in TCP/IP which allows for recovery of lost packets in a timely manner. With FRR, if a TCP endpoint receiver receives a data segment that is out of order (for example, an earlier packet may have been dropped in the network due to congestion); the receiving endpoint immediately sends a duplicate acknowledgement to the originating sender TCP endpoint. If the sender receives three duplicate acknowledgments (generally referred to as acks), the sender assumes that the data segment indicated by the ack is lost and will immediately retransmits the lost segment. In some cases, the duplicate acknowledgments may be based on selective acknowledgments (SACK) or non-SACK.

Another protocol that is intended to benefit from embodiments of the system and method defined herein would be SCTP (Stream Control Transmission Protocol). SCTP is a protocol for transmitting multiple streams of data at the same time between two end points that have established a connection in a network. In case the flow that needs authorization is SCTP, then all the packets of this flow may be dropped, and the smallest Transmission sequence number (TSN) from the dropped packets may be stored by the system as defined in detail herein. When, sending duplicate acknowledgements after authorization, TSN-1 may be used to indicate sender that it needs to retransmit all the packets that have been dropped.

Conventionally, as non-TCP endpoint nodes like switches and routers are not TCP aware, this fast retransmission was not possible to be associated with the authorization server. In particular, generally only network devices performing DPI would go to the extent of reading the packet in depth, and retaining information regarding the packet.

As part of the system and method disclosed herein, the non-TCP devices like a switch or a router (or other data plane devices) use TCP fast retransmission not to solve the traffic congestion but to resolve the QoE issues experienced during authorization.

Figure 6:
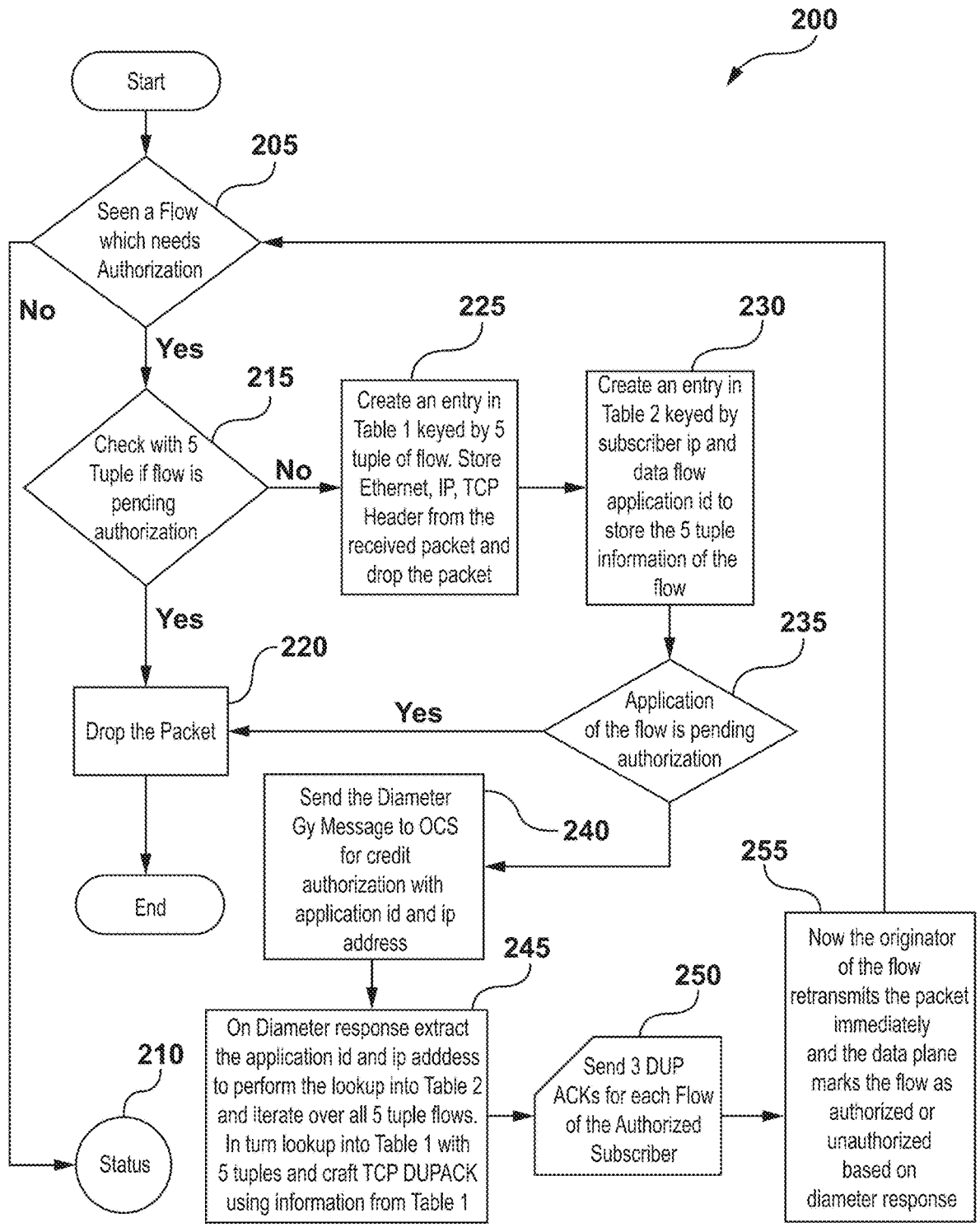
FIG. 6 illustrates a flow chart of a method for authorization of data flows.

FIG. 6 illustrates a method 200 for authorization of TCP and SCTP traffic flows. At 205, the authorization module 110 reviews a traffic flow and determines whether the flow needs authorization. If the traffic flow does not need authorization, the system may disregard the flow, at 210. In some cases, the traffic flow that does not need further authorization will follow a method similar to that detailed in FIG. 7. If the flow requires authorization, the authorization module may determine whether authorization is pending, at 215. At 220, if authorization is pending, the system 100 may drop the packet. If authorization is not yet pending, the authorization module 110 may create an entry associated with the flow and store flow and subscriber data in the memory component. In some cases, the authorization module 110 may store Ethernet layer data, IP layer data, TCP header and the like from the received packet, at 225. In particular, the system may store, for example, subscriber name, Source IP address, Destination IP address, source port, destination port, TCP sequence number, TCP ack number, Transmission Sequence Number (TSN) for an STOP flow or the like. In some cases, the system may store other data associated with the subscriber, for example possible tunnel types, for example, Virtual Local Area Network (VLAN), Multi-protocol label switching (MPLS), IPnIP, Network Address Translation (NAT) details or the like information to more distinctly distinguish the subscriber identity.

At 230, the authorization module 110 may further store subscriber data, for example, subscriber IP and application data associated with the traffic flow. The system is configured to store data in order to reduce the computational expenses of deriving the data from further packets and in order to obtain sufficient information to create appropriated DUP ACK or DUP SACK packets.

At 235, the system, via the authorization module, determines that the flow is pending authorization and may then drop the packet, at 220.

The system proceeds with the authorization of the TCP or SCTP traffic flow. In a specific example, at 240, a Diameter Gy message is sent to the Online Charging System (OCS) for credit authorization with the data flow application ID, subscriber name, subscriber IP address and the like. At 245, from the Diameter response, the analysis module 120 is intended to extract the application, subscriber data and authorization status and reviewed against the previously stored data. If there is a match, the analysis module may determine the associated data with the request. At 250, the transmission module 130 may now send three duplicate acknowledgments for the flow of the now authorized subscriber. The acknowledgement is crafted using stored data from the previously dropped packet. Although, in this example the Authorization server is shown as an Online Charging server, the Authorization server may be, for example, Lightweight Directory Access Protocol server, Policy and Changing Rules Function, an Online Charging System or other server used by an ISP for authorization.

At 255, the subscriber's user equipment retransmits the packet immediately on the receipt of the duplicate acks. The subscriber is now marked as either authorized or unauthorized and the system can respond to the packet accordingly. In some cases, the subscriber may have a plurality of flows awaiting authorization with the same characteristics, for example the same application type, URL, PCC rule, Monitoring key, Rating Group Service Id, or other flow/subscriber property or a combination of any of these characteristics. In these cases, at least three DUP ACKS may be sent for each of the plurality of flows with similar characteristics on the authorization of a single traffic flow.

Figure 7:
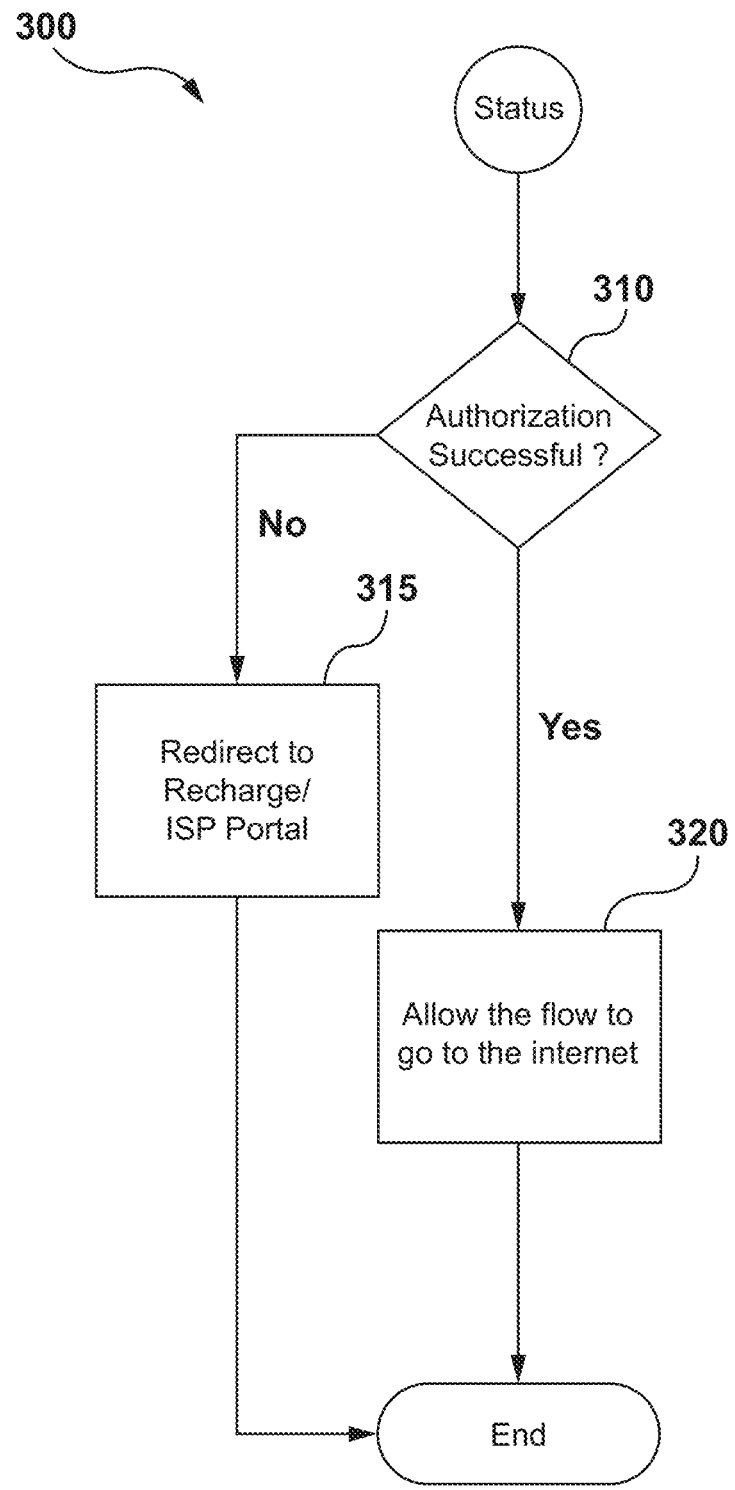
FIG. 7 illustrates a high level overview of a method for authorization according to an embodiment.

FIG. 7 illustrates a method 300 after authorization according to an embodiment, and is intended to occur subsequent to the method for authorization of TCP and SCTP traffic flows. The system receives a packet from a subscriber, where it has been noted that the packet does not require authorization (for example, the packet has been directed to this method from 210 of FIG. 6). The authorization module 110 determines whether authorization was successful at 310. If the authorization was successful, the system allows the flow to go to the Internet, at 315. If the authorization was not successful, the transmission module 130 may redirect the subscriber to a recharge page or to the service provider's portal for more information, at 320.

Figure 8:
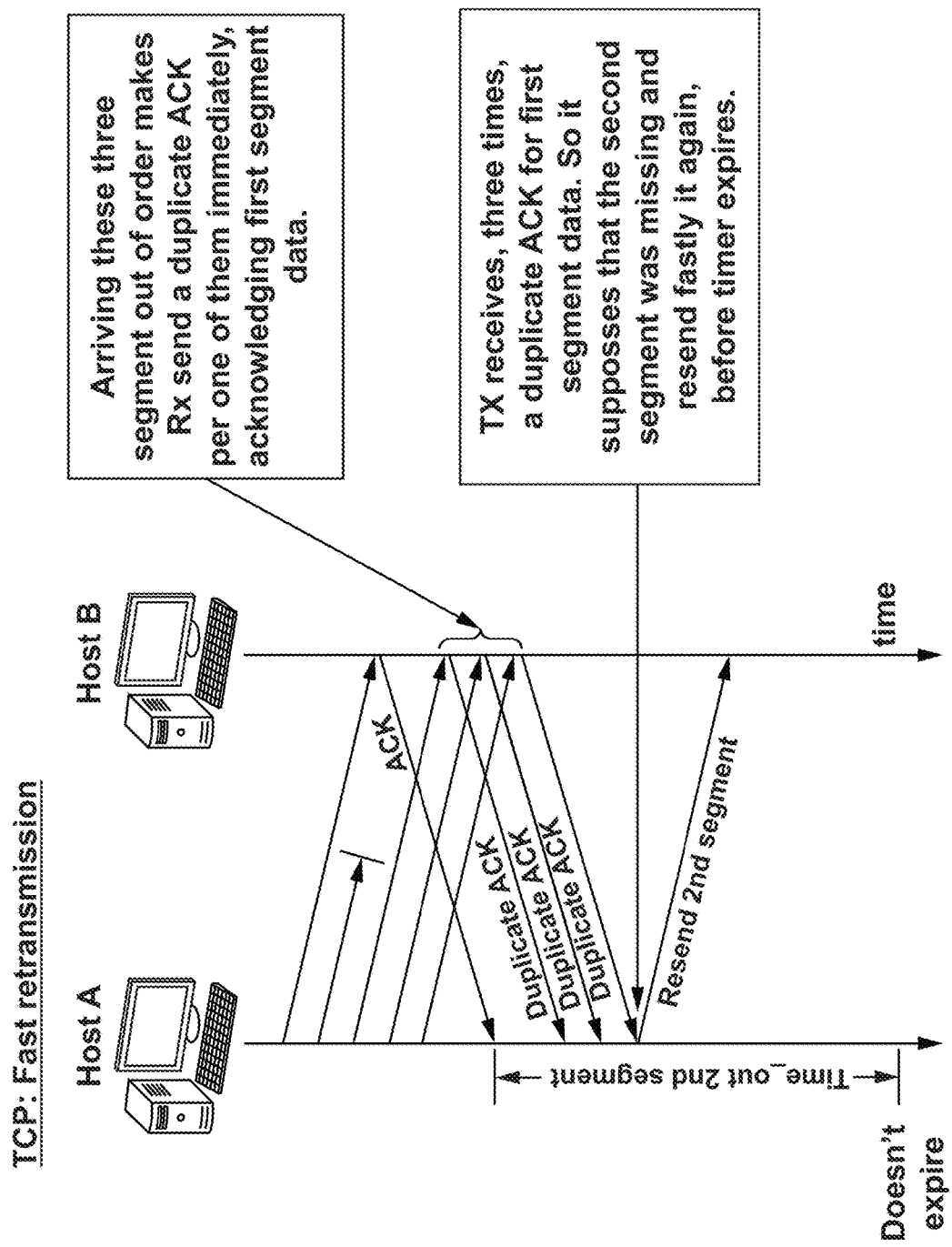
FIG. 8 illustrates an example of TCP fast retransmission.

FIG. 8 illustrates an example of fast retransmission. Fast retransmit is an enhancement to TCP that is intended to reduce the time a sender waits before retransmitting a lost segment. A TCP sender conventionally would use a simple timer to recognize lost segments. If an acknowledgement is not received for a particular segment within a specified time (a function of the estimated round-trip delay time), the sender will assume the segment was lost in the network, and will retransmit the segment.

Duplicate acknowledgement is the basis for the fast retransmit method. After receiving a packet (e.g. with sequence number 1), the receiver sends an acknowledgement by adding 1 to the sequence number (i.e. acknowledgement number 2). This indicates to the sender that the receiver received the packet number 1 and the receiver expects packet number 2. Suppose that three subsequent packets are lost. The next packets the receiver sees are packet numbers 5 and 6. After receiving packet number 5, the receiver sends an acknowledgement, but still only for sequence number 2. When the receiver receives packet number 6, the receiver sends yet another acknowledgement value of 2, as shown in FIG. 8. Duplicate acknowledgement occurs when the sender receives more than one acknowledgement with the same sequence number (2 in this example).

Since TCP does not know whether a duplicate ACK is caused by a lost segment or just a reordering of segments, it waits for a small number of duplicate ACKs to be received. It is assumed that if there is just a reordering of the segments, there will be only one or two duplicate ACKs before the reordered segment is processed, which will then generate a new ACK. If three or more duplicate ACKs are received in a row, it is a strong indication that a segment has been lost. TCP then performs a retransmission of what appears to be the missing segment, without waiting for a retransmission timer to expire, which could occur significantly later as shown in FIG. 8. A similar process is experienced for a SCTP flow.

The system and method proposed herein is based on the above behavior of sending at least three DUP ACKS such as at least three DUP ACKS for a TCP traffic flow or at least three DUP ACKS for an SCTP flow. The system and method are intended to send three or more than three Duplicate acknowledgments to ensure that the sender receives sufficient duplicate acks to resend the first packet.

When authorization is needed for the data flow on the data plane device associated with the system, the system stores the details of the current packet that is being dropped and applies a block action for any further packets of data flow that is being authorized. All subsequent packets for that data flow are dropped.

Data associated with the first packet of the traffic flow are stored prior to the packet being dropped. The data stored from that packet may be, for example, Ethernet layer information, IP layer information, TCP layer information. This information is used to create the DUP ACK packet. The DUP ACK is crafted using stored data, for example, the source IP address, destination IP address, source port, destination port. In a TCP traffic flow, TCP sequence number and acknowledgement number may be used while in an SCTP flow, a transmission sequence number may be used. The DUP ACK is sent to the sender of the data flow on authorization completion. The IP header's total length field is intended to be calculated based on the length of the crafted DUP ACK and the header checksum of the IP layer is recalculated. It will be understood that recalculating the checksum is done on the creation of any TCP packet.

A data flow is uniquely identified using 5-tuple information, for example, the Layer4 protocol, Source IP address, Source Port, Destination IP Address, and Destination Port. Whenever the flow is blocked for authorization, the information of the first dropped packet is stored against the 5-tuple flow information.

In some cases, there may be a plurality data flows waiting for the authorization to complete, once authorization response has arrived. The system is configured to iterate over all flows that are associated to this authorization response and send the DUP ACK for all the flows and remove the block action for all of the flows. In a similar manner, the system is configured to send duplicate acknowledgments using Transmission sequence number (TSN) for SCTP flows over all streams of the flows in the case of SCTP flows.

Figure 9:
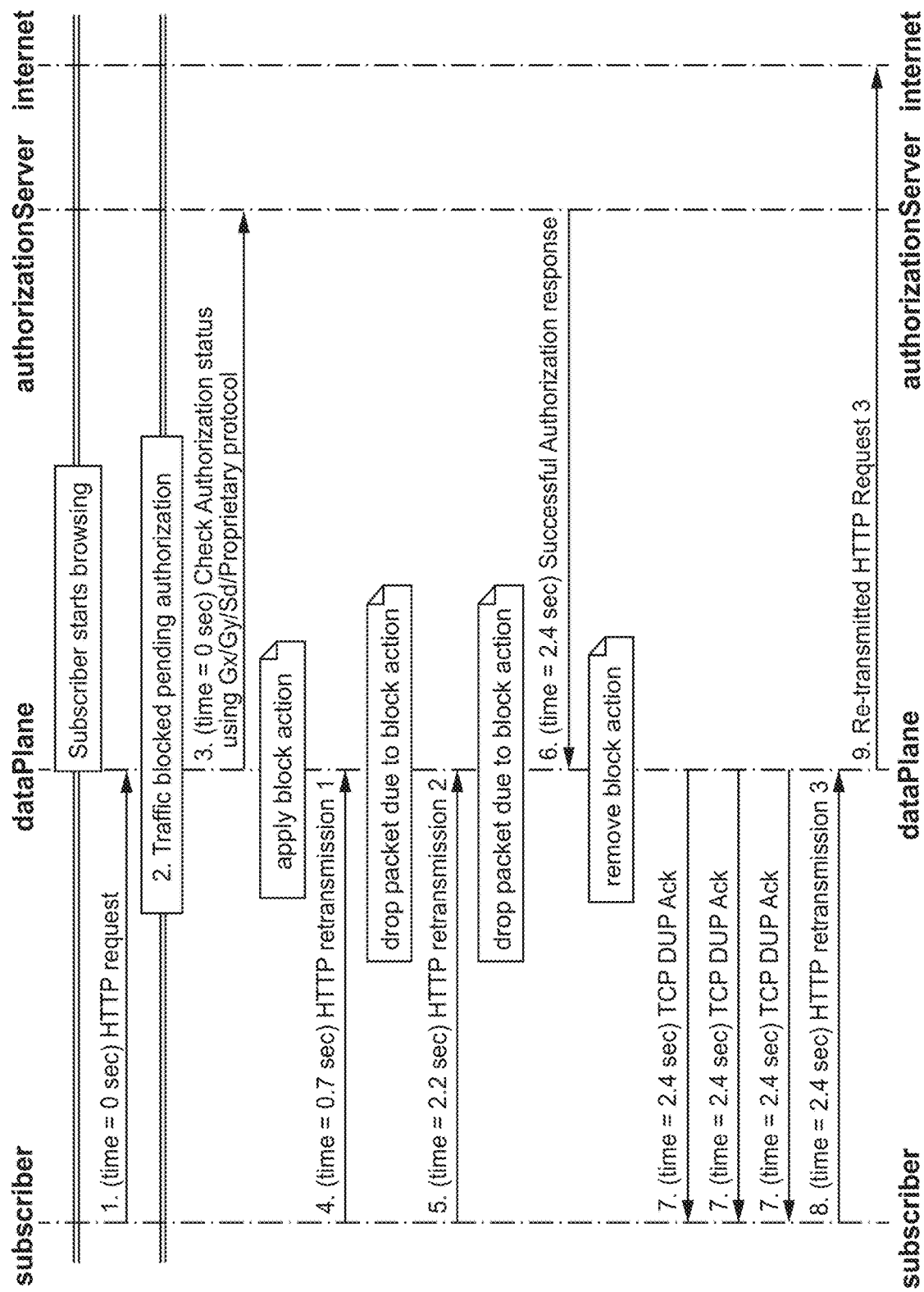
FIG. 9 illustrates a sequence diagram of an initialization of a new TCP data flow according to an embodiment.

FIG. 9 illustrates a sequence diagram illustrating the method detailed herein. In the above diagram, the subscriber starts browsing at time 0 Sec. The traffic is blocked due to pending authorization with Authorization Server (AAA). The system may be configured to send the request to Authorization Server for this subscriber/Subscriber's data application. In some cases, the system may be configured to have a separate device or a separate module send the request for authorization.

The first TCP retransmission of the data packet from the subscriber happens at time 0.7 sec. Since authorization is not complete, the system or data plane device drops the packet again. The second TCP retransmission of the data packet from the subscriber happens at time 2.2 sec. Since authorization is still not complete, the data plane device or system drops the packet again.

At time 2.4 sec, the success response is received on Data Plane device hosting the system. The Data plane device lifts the block action on the subscriber. At time 2.4 sec, the transmission module sends at least three DUP ACKs to the sender of the data, in this cases, the subscriber.

The reception of the DUP ACKs triggers the retransmission of the packet immediately at time 2.4 sec from the subscriber's device. As the block action is removed, this packet is allowed to go to web server, and the subscriber is allowed to browse internet.

From FIG. 9, the system and method detailed herein are intended to allow the subscriber to browse once the authorization is complete at time 2.4 sec. This earlier browsing time is intended to increase the QoE for the subscriber.

Figure 10:
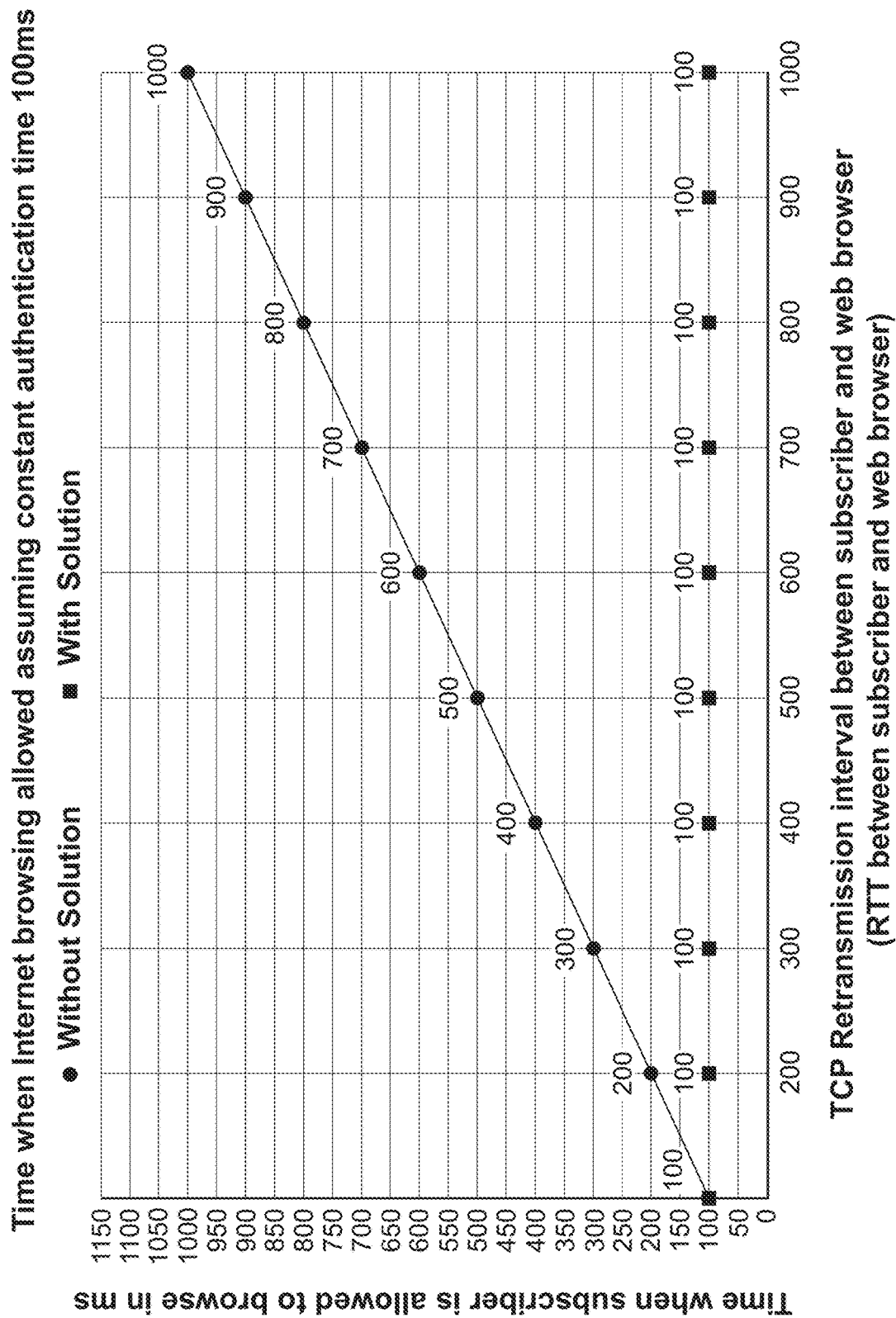
FIG. 10 is a graph illustrating time subscriber can browse in view of round trip time of traffic flow.
Figure 11:
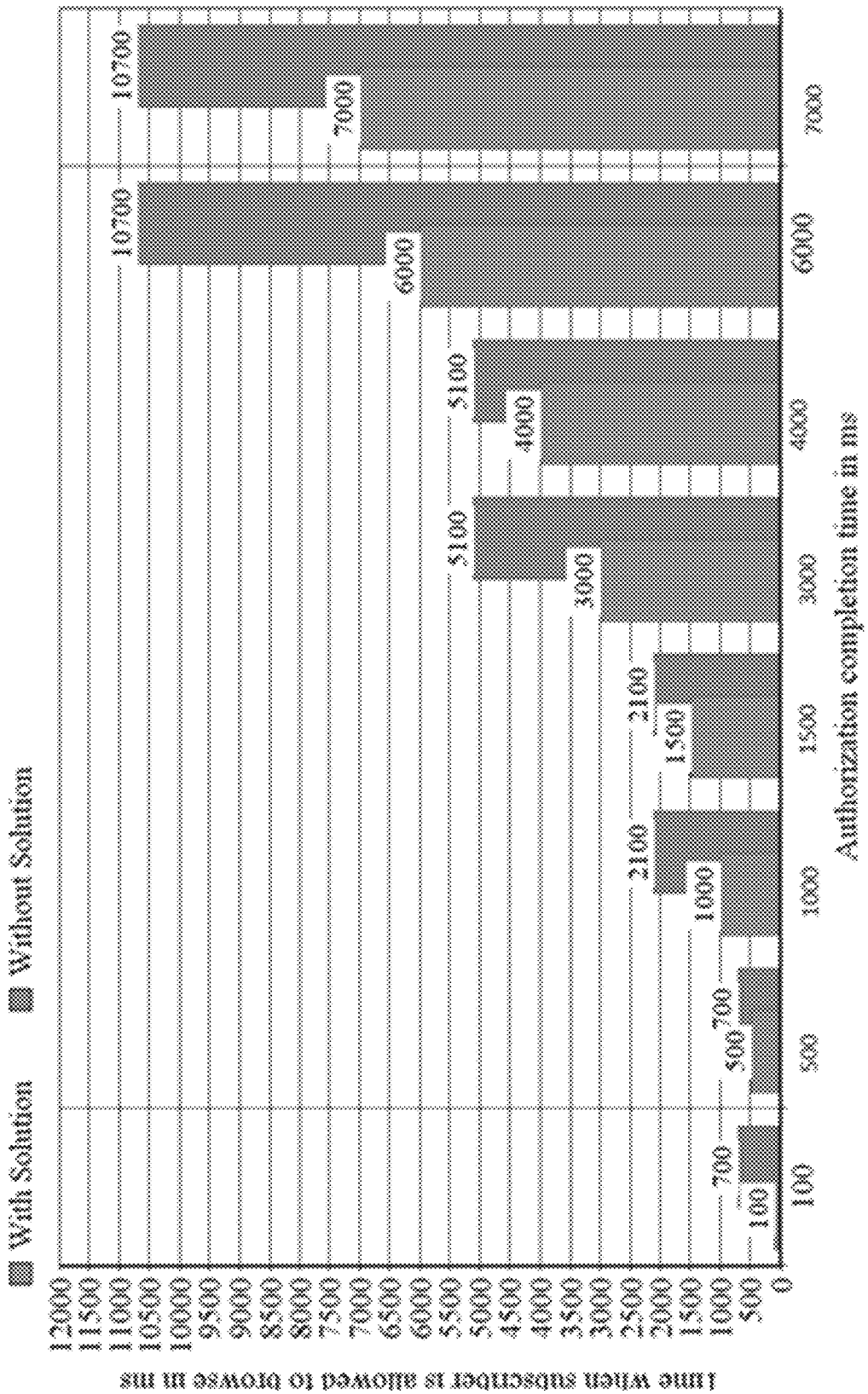
FIG. 11 illustrates time subscriber can browse in view of authorization time for the traffic flow.

FIG. 10 is a graph illustrating how the internet browsing experience would be during authorization assuming the Authorization server takes 100 ms to authorize the service/subscriber. From FIG. 10, it can be seen that with the proposed solution subscriber is allowed to browse internet after authorization. In this example, after 100 ms subscriber starts browsing. The time the subscriber is allowed to browse the internet is equal to the authorization time Further, FIG. 11 is a chart illustrating browsing time for subscriber. It can be seen that with embodiments of the system and method detailed herein, browsing is no more relying on retransmission interval. The subscriber is allowed to browse almost immediately after the subscriber has been authorized.

Embodiments of the system and method described herein are intended to have the ability to make TCP data sender provide for a retransmission based on event from the reauthorization server. It is believe that QoE of the subscriber would increase as the subscriber is no longer relying on the automatic TCP retransmission, but instead can retransmit after the authorization is complete.

The system and method detailed herein are intended to manage multiple flows simultaneously. Even if the subscriber is subsequently refused authorization, QoE may be improved as the transmission module is intended to send three DUP ACKS are sent and traffic flow is marked as redirect by the system. When the retransmitted packet comes immediately on receipt of the DUP ACKS, a redirect action is applied. In some cases, the redirect action will direct the subscriber to the reauthorization site or an ISP portal once authorization has been refused.

When the latency between authorization server and data plane device is high, the authorization may take further time and in conventional solutions, this may have a cascading effect on TCP retransmission. This issue may be especially prevalent in roaming cases where Authorization server is geographically distant from the data plane device. It is intended that embodiments of the system and method provide for greater support and therefore higher QoE in these situations by allowing retransmission on authorization instead of on waiting for a subsequent TCP retransmission.

Embodiments of the system and method described herein are intended to have a small memory component footprint. In particular, the state stored for the flows may be very small, as only TCP header fields of the first dropped packet are stored. Subsequent packets may be dropped therefore keeping the system compact. Conventionally, data plane devices store some state for every traffic flow. The system and method detailed herein are intended to store data necessary to create DUP acks. In some cases, extra information for example, sequence number, ack number, TSN for SCTP flows, and the like may also be stored by the system.

The system is configured to identify a data flow using a set of five different values that comprise a source IP address/port number, destination IP address/port number and the layer 4 protocol (TCP, UDP, and the like) in use.

In embodiments of the system and method, it is intended that the Application type may include reference to a specific application such as YouTube, FaceBook and the like. It is intended that each application have unique integer Id called ApplicationId. One or more data flows can belong to one ApplicationID. In a specific example, assume a subscriber has initiated 10 YouTube flows (ten YouTube tabs in browser). It will be understood that the system does not need to authorize each flow or send 10 requests to authorization server. The authorization server is intended to authorize the subscriber per application, so either the subscriber will be allowed to access YouTube flow or not. As such, the system is configured to send one query to the authorization server and store the authorization server's response and hereafter any YouTube flow seen can use this authorization status. Once an authorization response is received, the system is configured to send DUP ACKs to each of the flows that have now been allowed by the authorization server, in this example, the 10 YouTube flows would each be sent at least three DUP ACKs.

Specific examples below illustrate use cases that may benefit from the system and method detailed herein.

In one example, there is detailed an authorization use case, as presented herein. In summary, the blocked flows will keep retransmitting the packets until they are authorized on data plane. Conventionally, TCP Retransmission interval increases exponentially. Even after subscriber is authorized, subscriber has to wait for TCP retransmission to trigger. But with this system, the transmission module is configured to send at least three DUP ACKs, which makes the sender of the data flow to retransmit data immediately. It is intended that the subscriber can browse as soon as authorization is complete.

In a second use case, URL filtering is presented. Sometimes blacklisted URLs might be stored in some other servers and not on the data plane device. It will be understood that an HTTP flow may only authorized to be allowed if URL is white listed. When a new HTTP GET request is received, the system may request the authentication server to validate URL. Once the system receives the URL authentication response and if the URL is white listed, then transmission module may send DUP ACK. It is intended that the subscriber may immediately start browsing after the URL is authorized.

In another example use case, the system and method are intended to provide for Application Based Authorization. There are use cases where subscribers have application specific plans which may allow YouTube only if the subscriber has YouTube plan. The subscriber plan could be accessed/authorized from for example, the OCS, or the PCRF. Once a YouTube flow has started, the system requests the OCS/PCRF for authentication of YouTube plan. Until authorization is provided, all subsequent YouTube flows are blocked. After the subscriber's plan is authorized from OCS or PCRF, the transmission module may send at least three DUP ACKs to the YouTube server which is intended to make YouTube load faster. In this case, the data flow is identified as YouTube when the data plane gets a packet from YouTube server. In this case, it is the packet from the YouTube server that is dropped by the data plane. After authorization is complete, the system is configured to send DUP ACKs to the YouTube server. It is intended that the DUP ACKs are sent to the client/server based on whose packet the system has allowed to drop at the data plane.

In a further use case, the method and system detailed herein are intended to improve QoE for unauthorized subscribers. If the subscriber authorization fails, for example, the Authorization Server responds back with unsuccessful error code, then the subscriber would conventionally have to wait until the subsequent retransmission is done. On retransmission, the subscriber is redirected to the recharge page or service provider portal. If this retransmission is immediate then unauthorized subscribers do not need to wait longer for recharge portal, as the subscribers will be redirected immediately after Authorization with AA server is complete.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether the embodiments or elements thereof described herein are implemented as a software routine, hardware circuit, firmware, or a combination thereof.

Embodiments of the disclosure or elements thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for authorizing traffic flows in a computer network, the method comprising:
   receiving a packet from a traffic flow sent by a sender;
   determining whether the traffic flow has been previously authorized;
   if the traffic flow has not been previously authorized:
      determining a subscriber associated with the traffic flow, based on the data retrieved from the packet;
      requesting authorization from an authorization server based on the subscriber and the data retrieved from the packet;
      upon receiving a response from the authorization server, sending at least three duplicate acknowledgments to the sender, to generate a retransmission in advance of the standard retransmission timing;
   otherwise, if the traffic flow has been previously authorized, allowing the packet to continue to a destination.

2. A method for authorizing traffic flows according to claim 1 wherein determining whether the traffic flow has been previously authorized comprises determining whether the traffic flow has been previously refused; and
   if the traffic flow has been refused, redirecting the subscriber's traffic flow to provide the subscriber with further information regarding the refusal.

3. A method for authorizing traffic flows according to claim 1 wherein determining the subscriber associated with the traffic flow comprises determining subscriber name and subscriber IP address.

4. A method for authorizing traffic flows according to claim 1 wherein the data retrieved from the packet comprises retrieving the application type of the traffic flow.

5. A method for authorizing traffic flows according to claim 4 wherein authorization is based on the application type of the traffic flow and the subscriber associated with the traffic flow.

6. A method for authorizing traffic flows according to claim 5 further comprising:
   on receiving a response from the authorization server, determining whether the subscriber is associated with any other traffic flows with the same application type; and
   sending at least three duplicate acknowledgments to the sender for each traffic flow of the same application type, to generate a retransmission in advance of the standard retransmission timing.

7. A method for authorizing traffic flows according to claim 1 wherein the data retrieved from the packet comprises retrieving the destination URL of the traffic flow and authorization is based on the URL of the traffic flow.

8. A method for authorizing traffic flows according to claim 1 wherein the traffic flow is a Transmission Control protocol (TCP) or Stream Control Transmission Protocol (SCTP) traffic flow.

9. A method for authorization for traffic flows according to claim 1 wherein the authorization server is selected from the group comprising a Lightweight Directory Access Protocol server, Policy and Changing Rules Function, and Online Charging Systems.

10. A method for authorization for traffic flows according to claim 1 wherein the packet is dropped after a subscriber is associated with the traffic flow and the data is retrieved from the packet.

11. A system for authorizing traffic flows in a computer network, the system comprising:
- an authorization module configured to receive a packet from a traffic flow sent by a sender and determine a subscriber associated with the traffic flow, based on the data retrieved from the packet;
- an analysis module configured to determine whether the traffic flow has been previously authorized and if the traffic flow has not been previously authorized, request authorization from an authorization server based on the subscriber and the data retrieved from the packet and if the traffic flow has been previously authorized, allow the packet to travel to its destination; and
- a transmission module configured to send, upon receiving a response from the authorization server, at least three duplicate acknowledgments to the sender, to generate a retransmission in advance of the standard retransmission timing.

12. A system for authorizing traffic flows according to claim 11 wherein the analysis module is configured to determine whether the traffic flow has been previously refused; and
- if the traffic flow has been refused, the transmission module is configured to redirect the subscriber's traffic flow to provide the subscriber with further information regarding the refusal.

13. A system for authorizing traffic flows according to claim 11 wherein the authorization module is configured to determine subscriber name and subscriber IP address to associate the subscriber with the traffic flow.

14. A system for authorizing traffic flows according to claim 11 wherein the data retrieved from the packet comprises retrieving the application type of the traffic flow.

15. A system for authorizing traffic flows according to claim 14 wherein authorization is based on the application type of the traffic flow and the subscriber associated with the traffic flow.

16. A system for authorizing traffic flows according to claim 15 wherein on receiving a response from the authorization server, the analysis module is configured to determine whether the subscriber is associated with any other traffic flows with the same application type; and
- the transmission module is configured to send at least three duplicate acknowledgments to the sender for each traffic flow of the same application type, to generate a retransmission in advance of the standard retransmission timing.

17. A system for authorizing traffic flows according to claim 11 wherein the authorization module is configured to retrieve the destination URL of the traffic flow from the data retrieved from the packet and authorization is based on the URL of the traffic flow.

18. A system for authorizing traffic flows according to claim 11 wherein the traffic flow is a Transmission Control protocol (TCP) or Stream Control Transmission Protocol (SCTP) traffic flow.

19. A system for authorization for traffic flows according to claim 11 wherein the authorization server is selected from the group comprising a Lightweight Directory Access Protocol server, Policy and Changing Rules Function, and Online Charging Systems.

20. A system for authorization for traffic flows according to claim 11 wherein the authorization module is configured to drop the packet after a subscriber is associated with the traffic flow and the data is retrieved from the packet.

* * * * *